(12) United States Patent
Thomas

(10) Patent No.: US 11,033,005 B2
(45) Date of Patent: Jun. 15, 2021

(54) ELECTRONIC NOTIFICATION PET COLLAR

(71) Applicant: Stephen Thomas, Westbury, NY (US)

(72) Inventor: Stephen Thomas, Westbury, NY (US)

( * ) Notice: Subject to any disclaimer, the term of this patent is extended or adjusted under 35 U.S.C. 154(b) by 0 days.

(21) Appl. No.: 16/804,148

(22) Filed: Feb. 28, 2020

(65) Prior Publication Data
US 2020/0275638 A1  Sep. 3, 2020

Related U.S. Application Data

(60) Provisional application No. 62/812,003, filed on Feb. 28, 2019.

(51) Int. Cl.
*A01K 27/00* (2006.01)
*A01K 29/00* (2006.01)
*A01K 15/02* (2006.01)

(52) U.S. Cl.
CPC .......... *A01K 27/009* (2013.01); *A01K 27/001* (2013.01); *A01K 29/005* (2013.01); *A01K 15/023* (2013.01)

(58) Field of Classification Search
CPC .. A01K 27/009; A01K 27/001; A01K 29/005; A01K 1/023
USPC ...................................................... 340/573.3
See application file for complete search history.

(56) References Cited

U.S. PATENT DOCUMENTS

| | | | |
|---|---|---|---|
| 6,047,664 A | 4/2000 | Lyerly | |
| 7,913,653 B2 | 3/2011 | Jordan | |
| 2002/0180591 A1 | 12/2002 | Berstling et al. | |
| 2008/0246597 A1 | 10/2008 | Carlson et al. | |
| 2012/0252486 A1* | 10/2012 | Lopez | A01K 27/009 455/456.1 |
| 2012/0287761 A1 | 11/2012 | Higgins | |
| 2013/0014706 A1* | 1/2013 | Menkes | A01K 27/009 119/859 |
| 2014/0123912 A1* | 5/2014 | Menkes | A61B 5/02055 119/859 |
| 2014/0196673 A1* | 7/2014 | Menkes | A61B 5/0002 119/859 |
| 2015/0075446 A1 | 3/2015 | Hu | |
| 2015/0373951 A1* | 12/2015 | Kelly | A01K 27/009 119/719 |
| 2016/0058379 A1* | 3/2016 | Menkes | A61B 7/00 600/301 |

(Continued)

*Primary Examiner* — Ojiako K Nwugo
(74) *Attorney, Agent, or Firm* — Boudwin Intellectual Property; Daniel Boudwin

(57) ABSTRACT

An electronic notification pet collar is shown and described. The pet collar includes a collar strap. The collar strap has an interior volume. The interior volume houses wiring connected to lighting and an external component module. The collar strap has an externally affixed component module that houses a CPU, a GPS module, a wireless transceiver, a mute button, a speaker, and a battery pack. The CPU is connected to a plurality of lights that are located through the collar strap. There is a speaker located within the external component module. The CPU and GPS are coupled to a wireless transceiver. The wireless transceiver is connected to a mobile device which is configured to set visual and audible alarms as well as control collar light display. The mobile device controls and activates the visual and audible alarms on the mobile device and collar as well as the GPS module.

17 Claims, 4 Drawing Sheets

(56) References Cited

U.S. PATENT DOCUMENTS

| | | | |
|---|---|---|---|
| 2016/0135431 A1* | 5/2016 | Sheldon | A01K 11/008 |
| | | | 119/859 |
| 2016/0242393 A1* | 8/2016 | Kennedy | A01K 29/005 |
| 2017/0135315 A1* | 5/2017 | Marmen | A01K 27/006 |
| 2017/0172110 A1* | 6/2017 | Dewey | A01K 27/001 |
| 2020/0267936 A1* | 8/2020 | Tran | A01K 29/005 |

* cited by examiner

ELECTRONIC NOTIFICATION PET COLLAR

CROSS REFERENCE TO RELATED APPLICATIONS

This application claims the benefit of U.S. Provisional Application No. 62/812,003 filed on Feb. 28, 2019. The above identified patent application is herein incorporated by reference in its entirety to provide continuity of disclosure.

BACKGROUND OF THE INVENTION

The present invention relates to pet collars. More particularly, the present invention provides an electronic pet collar that gives a pet owner notifications, and features illumination which is both fashionable and protective. It also features GPS tracking and can be used as a training aid.

While owning a pet provides the owner with immense happiness, it also requires significant work and responsibility. In particular, many pets need to be let out of the house to relieve themselves. For some owners, it can be difficult to remember to let their pet out. For poorly trained, un-trained, elderly, or unhealthy pets this can result in the pet urinating and/or defecating inside. For trained pets, this may lead to urinary/fecal retention which is known to have adverse long term health effects.

For many owners, it can be difficult to remember the exact time of day that a pet should be fed. Pets thrive when fed at the same time every day. In many cases, it can be difficult for owners to remember to feed their pet at the same time without a reminder.

In other instances, a pet may escape their owner and become lost. It can be extremely difficult to find a lost pet. Some owners have a microchip implanted into their pet. While this can be an effective way to locate a pet, this method is invasive and expensive. Owners need a cost efficient and safe way to locate lost pets.

Consequently, there is a need in for an improvement in the techniques one uses when caring for pets. The present invention substantially diverges in design elements from the known techniques, while at the same time solves many problems such as: providing reminders to owners to let their pet outside, reminding them to feed their pet in a timely manner, GPS tracking to locate a lost pet, and illuminating LEDs for night time safety. In addition, the LED lighting display is aesthetically attractive. In this regard, the present invention substantially fulfills these needs.

SUMMARY OF THE INVENTION

The present invention provides an electronic notification pet collar wherein the same can be utilized for providing convenience for the user when taking care of a pet. The electronic notification pet collar comprises a strap member, wherein the strap member has an interior volume. In addition, the strap member has an externally affixed waterproof component module which houses a CPU. The CPU is operably coupled to a plurality of LED's located on/through a sidewall of the strap member. A speaker is operably coupled to the CPU, wherein the speaker is configured to play sounds at a determined time.

Another object of the electronic notification pet collar is to have a GPS unit coupled to the CPU, wherein the GPS is configured to locate and track the collar.

Another object of the electronic notification pet collar is to have a power source located within the external component module.

Another object of the electronic notification pet collar is to have a wireless transceiver located within the external component module.

Another object of the electronic notification pet collar is to have the wireless transceiver be configured to communicate with a mobile application.

Another object of the electronic notification pet collar is to have a mute button located through a sidewall of the external component module, wherein the mute button is operably coupled to the speaker.

Another object of the electronic notification pet collar is to have an attachment clasp located at each of a first end and a second end of the strap.

Another object of the electronic notification pet collar is to have the mobile application be configured to show the location of the collar.

Another object of the electronic notification pet collar is to have the mobile application configured to set alarms, wherein the alarms activate the speaker and the lights located in the pet collar, as well as an alarm notification on the mobile device itself.

Another object of the electronic notification pet collar is to have the mobile application configured to functionally control the animation, brightness, and color array of the LED's on the collar.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
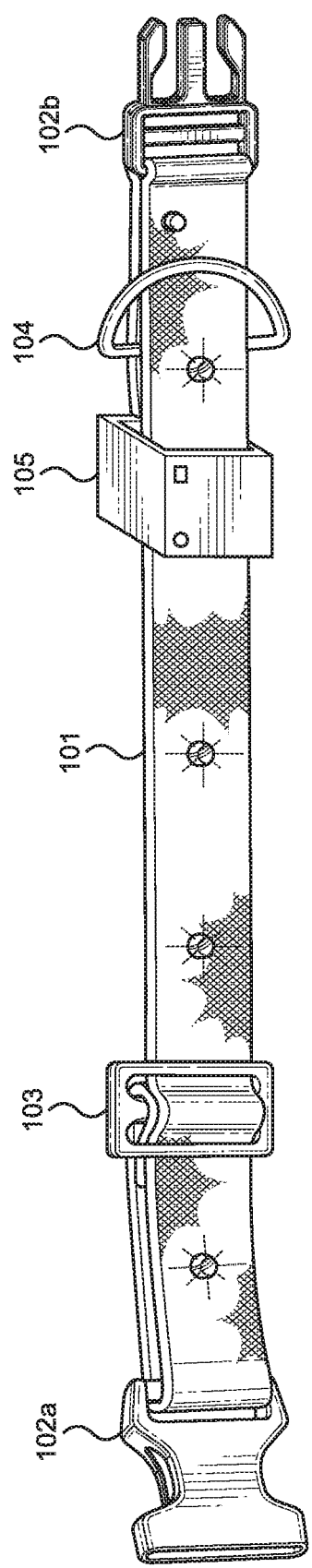
FIG. 1 shows a top down view of an embodiment of the electronic notification pet collar.

Reference is made herein to the attached drawings. Like reference numerals are used throughout the drawings to depict like or similar elements of the electronic notification pet collar. For the purposes of presenting a brief and clear description of the present invention, a preferred embodiment will be discussed as used for the electronic notification pet collar. The figures are intended for representative purposes only and should not be considered to be limiting in any respect.

Referring now to FIG. 1, there is shown a top down view of an embodiment of the electronic notification pet collar. The electronic notification pet collar includes a collar strap 101. The collar strap 101 is comprised of a durable material. As described in FIG. 2 the collar strap 101 has an interior volume. In one embodiment the collar strap 101 is comprised of a water resistant material. In other embodiments the collar strap 101 is made from waterproof material. This will protect the electrical components as described herein from outside elements. The collar strap 101 may have varying widths and lengths.

In one embodiment the collar has a buckle 102a, 102b, to secure the collar strap 101 around a pet's neck. In this embodiment there is a first part of the buckle 102a attached at one end of the collar strap 101 and a second part of the buckle 102a attached at the opposite end of the collar strap 101. In the shown embodiment the first part of the buckle 102a is a female end and the second part of the buckle 102b is a male end. In one embodiment the male and female ends of the buckle are made of plastic, in another embodiment these buckle ends are made of metal. In other embodiments the buckle parts may be switched. In yet other embodiments the collar strap 101 is secured to a pet using a buckle that has a pin on one side and a plurality of holes located on the other side. In this embodiment the pin will engage a chosen hole securing the collar strap 101 to the pet.

In some embodiments the collar strap 101 has an adjuster 103 located thereon. In the shown embodiment the adjuster 103 pulls the collar strap 101 through the first part of the buckle 102a and back along the collar strap 101, such that a length of the collar strap 101 can be adjusted thereby. In this manner, the collar strap 101 can be used with pets of various sizes. The adjuster 103 is configured to secure to the collar strap 101 via friction. The more the collar strap 101 is pulled upon the higher the coefficient of friction will be and the more the adjuster 103 will be held in place.

The collar strap 101 further includes a connection ring 104. The connection ring 104 is connected along the collar strap 101. In one embodiment the connection ring 104 is made from metal. The connection ring 104 is configured to secure a leash or lead to the collar strap 101. In one embodiment the connection ring 104 is able to move along a section of the collar strap 101. In other embodiments the connection ring 104 is secured in place along the collar strap 101.

The collar strap 101 has an external component module 105 attached thereto. In one embodiment the collar strap 101 is configured to fit through the external component module 105. The external component module 105 is a housing having an interior volume. In one embodiment the interior volume is a water proof area.

Figure 2:
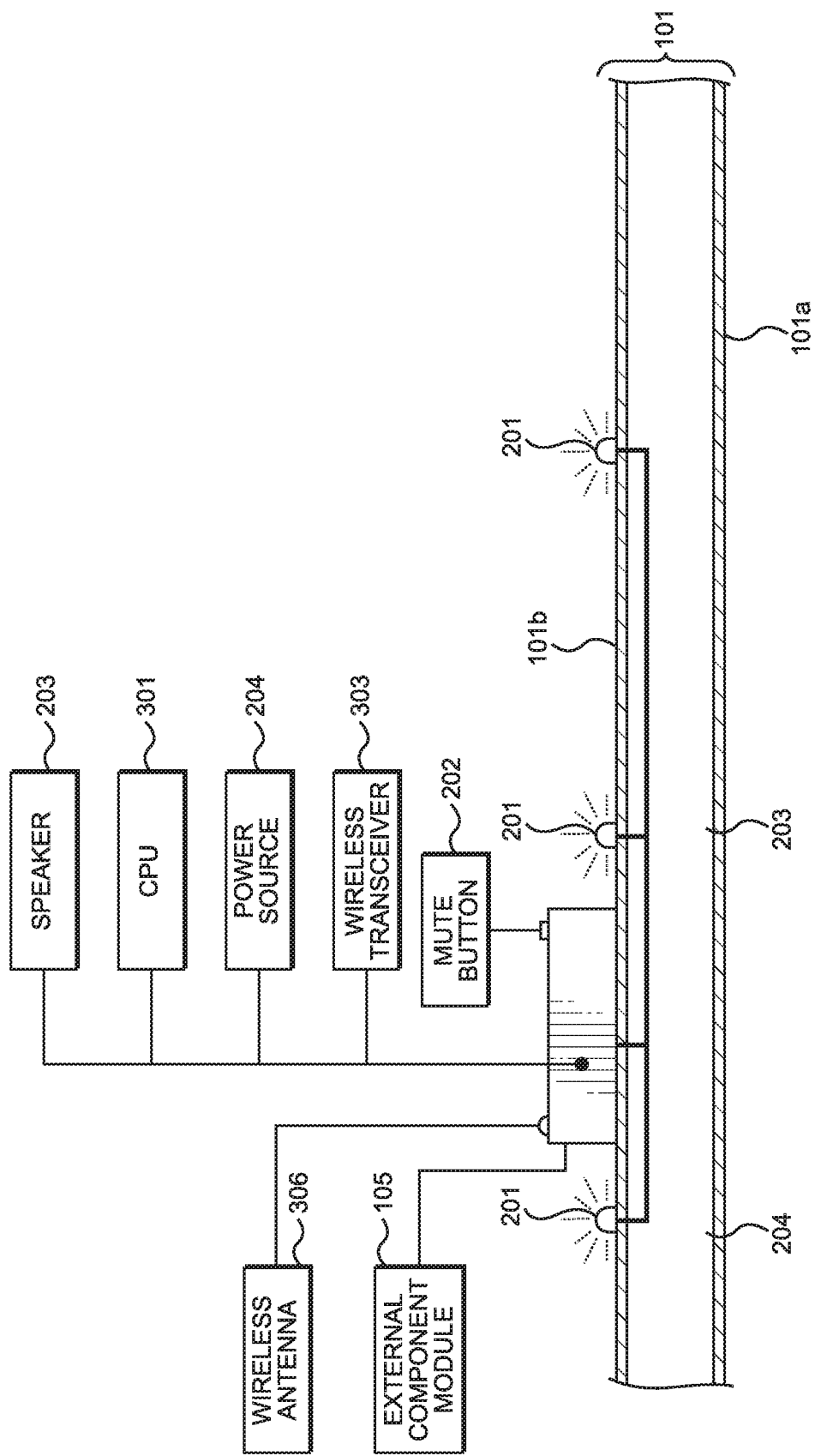
FIG. 2 shows a cross sectional view of an embodiment of the electronic notification pet collar.

Referring now to FIG. 2, there is shown a cross sectional view of an embodiment of the electronic notification pet collar. The collar strap 101 has a top section 101b and a bottom section 101a creating an interior volume. The interior volume is configured to safely house wiring connecting a plurality lights 201 to the external component module 105. The plurality of lights 201 are secured on/through top section 101b of the collar strap 101. This will ensure that the lights 201 are outward facing away from the pet's body. This will ensure that the lights are visible and that the lights 201 do not burn the pet. In one embodiment the plurality of lights 201 will have waterproof connections. In another embodiment the plurality of lights 201 are LED lights. The lights may be activated with an alarm or as needed by a user as described below in the description of FIG. 4.

The external component module 105 houses various electrical components as described herein. There is a power source 204 located within the external component module 105. The power source 204 is connected to the plurality of lights 201. In one embodiment the power source 204 is a rechargeable battery.

The shown embodiment further has a speaker 203 located within the external component module 105. The speaker 203 is configured to play various sounds from the electronic notification collar as described in the description of FIG. 3 and FIG. 4. The speaker 203 is connected to a mute button 202. The mute button 202 will mute the speaker 203 when pressed.

The external component module 105 further houses a CPU 301 and a wireless transceiver 303 as described below in the description of FIG. 3. In one embodiment there is a wireless antenna 306 incorporated into the external component module 105. In one embodiment the wireless antenna 306 is protruding from external component module 105. The wireless antenna 306 is connected as described below in FIG. 3.

Figure 3:
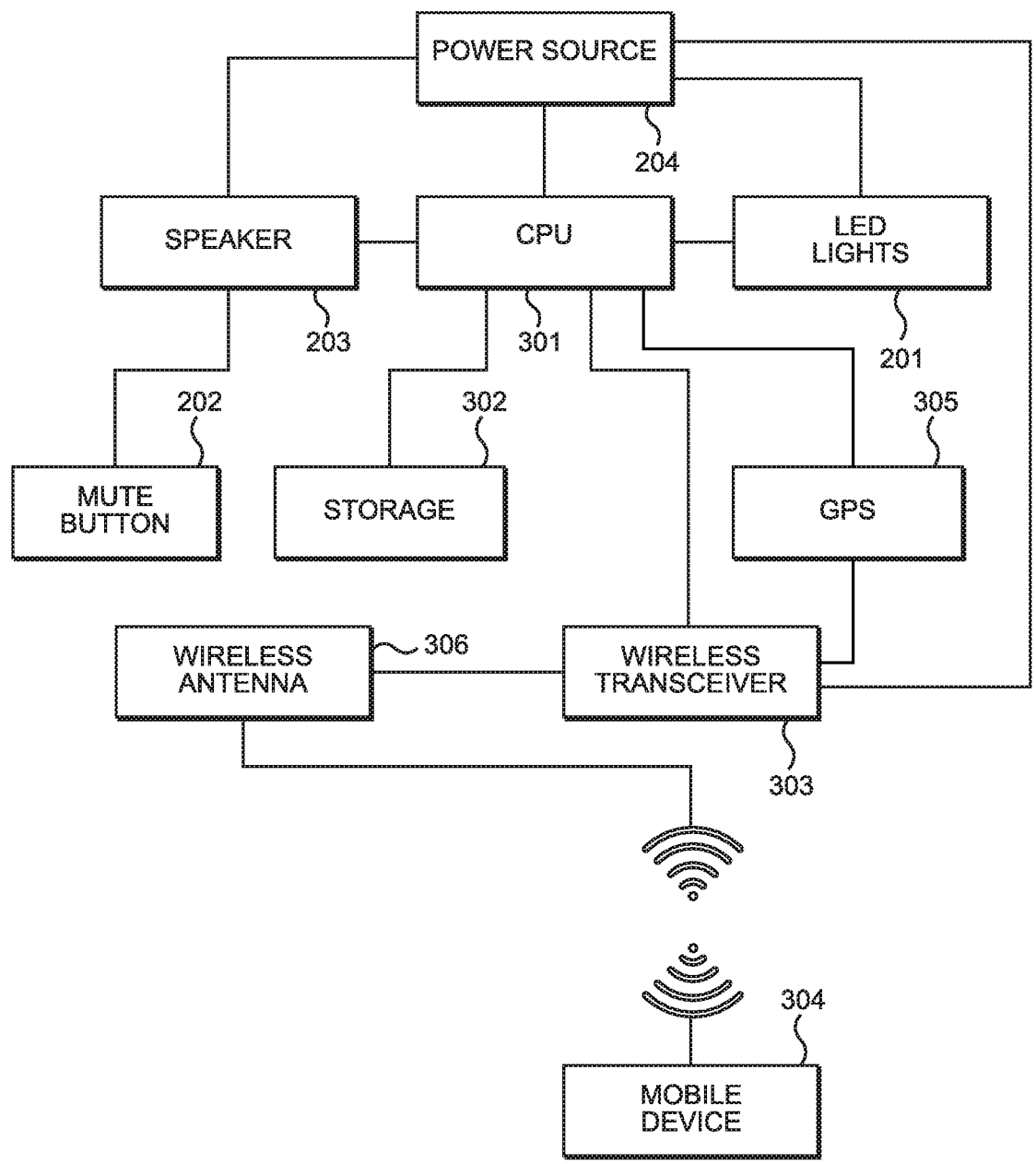
FIG. 3 shows a wiring diagram of an embodiment of the electronic notification pet collar.

Referring now to FIG. 3, there is shown a wiring diagram of an embodiment of the electronic notification pet collar. As mentioned above, the electronic notification collar includes a power source 204. In one embodiment the power source 204 is a battery. In another embodiment the power source 204 is wirelessly chargeable. The power source 204 may be connected to various other items including but not limited to: a speaker 203, a CPU 301, the plurality of lights 201, a GPS circuit 305, and a wireless transceiver 303.

The CPU 301 is coupled to a storage unit 302. The storage unit 302 will store alarm times and operations as needed by the CPU 301. The CPU 301 is further coupled to the speaker 203 and the plurality of lights 201. The CPU 301 is configured to activate the speaker 203 and the plurality of lights 201 respectively. In one embodiment the CPU 301 activates the speaker 203 and the plurality of lights 201 when the alarm time matches the time of day. In another embodiment the alarm time is a timer. In yet another embodiment the CPU 301 activates the plurality of lights 201 upon a command from a mobile device 304. The speaker 203 is further connected to a mute button 202 as described above. In some embodiments, once the speaker 203 is activated it can be muted by pressing the mute button 202.

The CPU 301 is coupled to a wireless transceiver 303. The wireless transceiver 303 may be configured to connect to a mobile device 304 in multiple ways. In one embodiment the wireless transceiver 303 uses Bluetooth technology. In another embodiment, the wireless transceiver 303 uses WIFI. In yet another embodiment the wireless transceiver 303 uses mobile wireless technology.

In one embodiment the CPU 301 and wireless transceiver 303 are coupled to a GPS unit 305. The GPS unit 305 is configured to transmit via the wireless transceiver 303 the location of the pet. In one embodiment the GPS unit 305 is constantly on. In another embodiment the GPS unit 305 may be activated upon a signal sent from the mobile device 304. This embodiment will be a way to conserve the power source 204.

Figure 4:
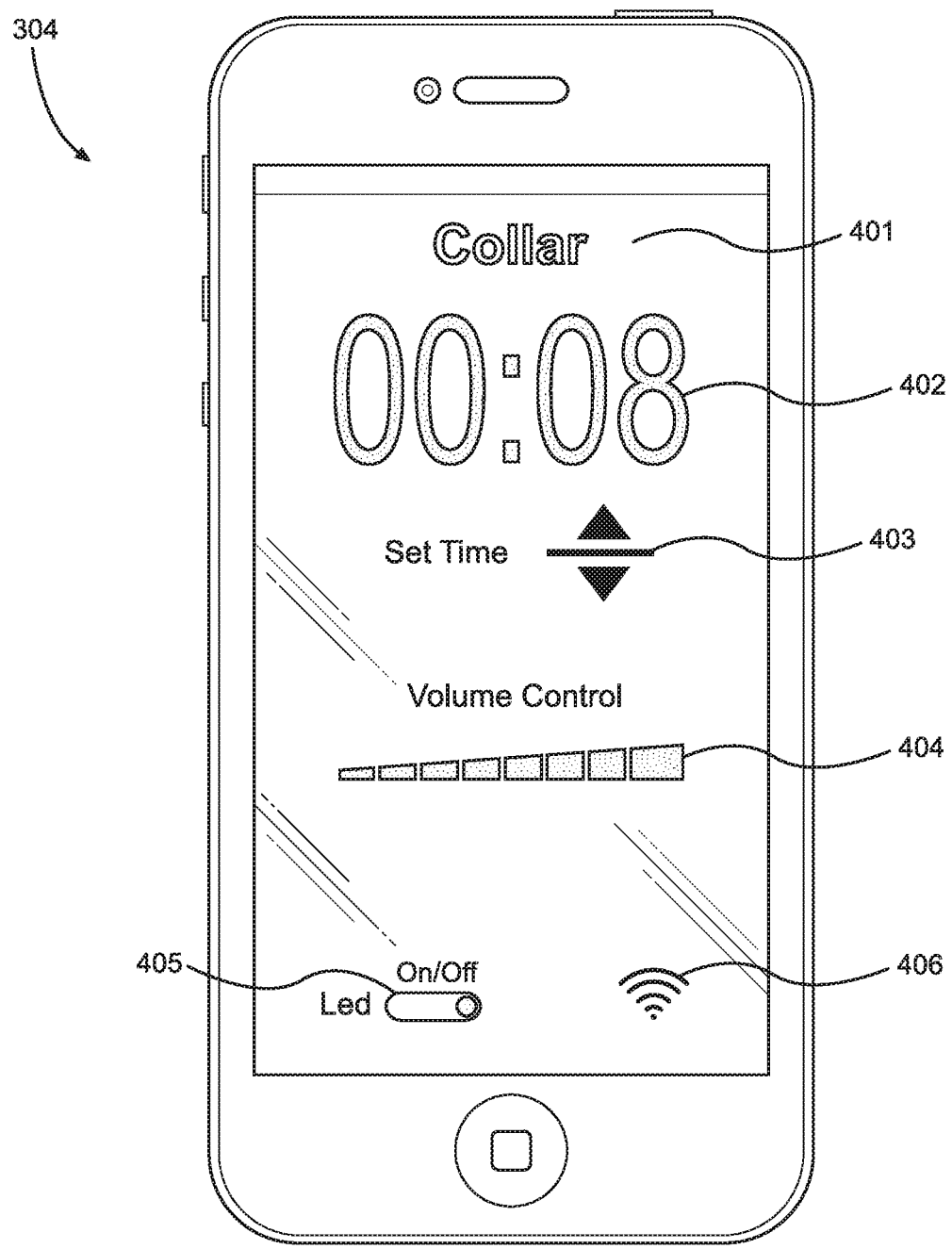
FIG. 4 shows a perspective view of an embodiment of the mobile application for the electronic notification pet collar.

Referring now to FIG. 4, there is shown a perspective view of an embodiment of the mobile application for the electronic notification pet collar. In the shown embodiment there is a mobile device 304 running a mobile application to control the electronic notification pet collar. The shown application is merely an example of some features that may be incorporated into the application. Other features may be added and the display of features may be changed. The mobile application has a name 401 of the collar shown at the top of the shown embodiment. In one embodiment more than one collar may be run by the same application. In other embodiments the name 401 is customizable by the user to better identify the collar being controlled.

The mobile application further has an alarm time 402 and an alarm control 403. An alarm can be set via the alarm control 403. The alarm time 402 will display the time the alarm will activate. When the alarm activates, the collar will light up and/or play audible sounds through the speaker as described above. In some embodiments more than one alarm may be set at one time. This will allow a user to set a repeating alarm at feeding times for example. In other embodiments the alarm acts as a time. For example, if the pet must go outside 30 minutes after eating an alarm is set for feeding then a second alarm could be set for the pet to go outside The mobile application has a volume control 404 built in. The volume control 404 is capable of controlling the volume output of the speaker on the collar. In some embodiments there is a second volume control, one controlling the mobile device's alarm volume, the other controlling the collar's speaker volume. In some embodiments there is further a light on/off control 405. This will allow a user to activate the lights on the collar independent of an alarm if so desired. The shown embodiment has a connection notification 406. The connection notification 406 will identify whether the displayed collar name is connected to the mobile device 304 for controlling.

In one embodiment the mobile application features functional control over the array of lights located in/on the collar. In one embodiment the functional control is has the ability to adjust brightness of the lights. In another embodiment the functional control has the ability to adjust individual color of the lights. In yet another embodiment the functional control has the ability to create animation of the lights. In other embodiments the functional control has the ability to control combinations of the above listed features. In yet further embodiments the functional control may control additional features possible using different lights.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic notification pet collar, comprising:
   a strap member, wherein the strap member has an external component module attached thereto;
   the external component module houses a CPU;
   the CPU is operably coupled to a plurality of lights located on a sidewall of the strap member;
   a speaker member operably coupled to the CPU, wherein the speaker is configured to play sounds at a determined time;
   a mute button located through a sidewall of the external component module, wherein the mute button is operably coupled to the speaker.

2. The electronic notification pet collar of claim 1, further comprising a power source located within the external component module.

3. The electronic notification pet collar of claim 1, further comprises a wireless transceiver located within the external component module.

4. The electronic notification pet collar of claim 1, further comprising an attachment clasp located at each a first end and a second end of the strap.

5. The electronic notification pet collar of claim 1, further comprising an adjuster located along the strap, wherein the adjuster is configured to adjust the length of the strap.

6. An electronic notification pet collar, comprising:
   a strap member, wherein the strap member has an external component module attached thereto;
   the external component module houses a CPU;
   the CPU is operably coupled to a plurality of lights located on a sidewall of the strap member;
   a speaker member operably coupled to the CPU, wherein the speaker is configured to play sounds at a determined time;
   a GPS unit located within the external component module is coupled to the CPU, wherein the GPS is configured to locate the collar;
   a mute button located through a sidewall of the external component module, wherein the mute button is operably coupled to the speaker.

7. The electronic notification pet collar of claim 6, further comprising a power source located within the external component module.

8. The electronic notification pet collar of claim 6, further comprises a wireless transceiver located within the external component module.

9. The electronic notification pet collar of claim 6, further comprising an attachment clasp located at each a first end and a second end of the strap.

10. The electronic notification pet collar of claim 6, further comprising an adjuster located along the strap, wherein the adjuster is configured to adjust the length of the strap.

11. An electronic notification pet collar, comprising:
    a strap member, wherein the strap member has an external component module attached thereto;
    the external component module houses a CPU;
    the CPU is operably coupled to a plurality of lights located on a sidewall of the strap member;
    a speaker member located within the external component module is operably coupled to the CPU, wherein the speaker is configured to play sounds at a determined time;
    a mute button located through a sidewall of the strap member, wherein the mute button is operably coupled to the speaker;
    a wireless transceiver located within the external component module is operably coupled to the CPU, wherein the wireless transceiver is configured to communicate with a mobile application.

12. The electronic notification pet collar of claim 11, wherein the mobile application is configured to functionally control the animation, brightness, and color array of the plurality of lights on the collar.

13. The electronic notification pet collar of claim 11, further comprising an attachment clasp located at each a first end and a second end of the strap.

14. The electronic notification pet collar of claim 11, further comprising an adjuster located along the strap, wherein the adjuster is configured to adjust the length of the strap.

15. The electronic notification pet collar of claim 11, further comprising a GPS unit located within the external component module and coupled to the CPU, wherein the GPS is configured to locate the collar.

16. The electronic notification pet collar of claim 15, wherein the mobile application is configured to show the location of the collar.

17. The electronic notification pet collar of claim 11, wherein the mobile application is configured to have alarms set;

and wherein the alarm activates the speaker and the lights located in the pet collar.

* * * * *